US009793831B2

(12) United States Patent
Ogawa

(10) Patent No.: US 9,793,831 B2
(45) Date of Patent: Oct. 17, 2017

(54) MOTOR CONTROL CIRCUIT AND METHOD

(71) Applicant: Semiconductor Components Industries, LLC, Phoenix, AZ (US)

(72) Inventor: Takashi Ogawa, Gifu-ken (JP)

(73) Assignee: SEMICONDUCTOR COMPONENTS INDUSTRIES, LLC, Phoeniz, AZ (US)

( * ) Notice: Subject to any disclaimer, the term of this patent is extended or adjusted under 35 U.S.C. 154(b) by 115 days.

(21) Appl. No.: 14/578,432

(22) Filed: Dec. 20, 2014

(65) Prior Publication Data

US 2015/0180378 A1     Jun. 25, 2015

Related U.S. Application Data

(60) Provisional application No. 61/918,693, filed on Dec. 20, 2013.

(51) Int. Cl.
    *H02K 7/10*           (2006.01)
    *H02P 3/00*           (2006.01)
        (Continued)

(52) U.S. Cl.
    CPC ................. *H02P 1/02* (2013.01); *H02P 6/085* (2013.01); *H02P 6/17* (2016.02); *H02P 6/182* (2013.01); *H02P 6/20* (2013.01); *H02P 27/085* (2013.01)

(58) Field of Classification Search
    CPC .......... H03K 4/625; H03K 5/19; B60L 3/108; B60L 7/26; B60T 17/22
See application file for complete search history.

(56) References Cited

U.S. PATENT DOCUMENTS 6,359,406 B1    3/2002   Chiu et al.
6,483,270 B1    11/2002   Miyazaki et al.
(Continued)

FOREIGN PATENT DOCUMENTS

JP     2006-299810 A    11/2006
JP     2008-43166 A     2/2008
(Continued)

OTHER PUBLICATIONS

Application Note AN44140A by Panasonic, Sine-wave PWM drive system and rotor position detection method by 1-Hall-sensor, 1-Hall-Sensor Driver IC for 3-phase Brushless Motor; Doc No. TA4-EA-06180; Established Apr. 19, 2013; Revised Nov. 21, 2013.
(Continued)

*Primary Examiner* — Marlon Fletcher
(74) *Attorney, Agent, or Firm* — Rennie William Dover

(57) ABSTRACT

In accordance with an embodiment, a stopping circuit includes a detection circuit connected to a subtraction amount determination circuit. A subtraction circuit is connected to the subtraction circuit and the subtraction circuit is coupled for receiving an output signal from the subtraction amount determination circuit. A duty determination is connected to the subtraction circuit and a state controller is connected to the duty determination circuit. A counter is connected to a state controller. In accordance with another embodiment a method for stopping a motor is provided by decreasing a duty of a drive signal. The duty of the drive signal is lowered from a first level to a predetermined level. A braking state is entered in response to the duty of the pulse width modulation signal achieving the predetermined level.

19 Claims, 3 Drawing Sheets

(51) Int. Cl.
*H02P 1/02* (2006.01)
*H02P 6/182* (2016.01)
*H02P 6/20* (2016.01)
*H02P 27/08* (2006.01)
*H02P 6/08* (2016.01)
*H02P 6/17* (2016.01)

(56) References Cited

U.S. PATENT DOCUMENTS

| | | | |
|---|---|---|---|
| 8,729,839 B2 | 5/2014 | Suzuki et al. | |
| 2006/0290312 A1* | 12/2006 | Nagai | H02P 25/024 318/599 |
| 2008/0272724 A1* | 11/2008 | Hayashi | H02P 1/04 318/430 |
| 2008/0315807 A1* | 12/2008 | Loffler | H02P 6/15 318/400.07 |
| 2008/0315808 A1* | 12/2008 | Mishima | H02P 29/032 318/400.21 |
| 2009/0045762 A1* | 2/2009 | Hayashi | H02P 7/29 318/379 |
| 2009/0195202 A1* | 8/2009 | Takeuchi | H02P 6/16 318/400.37 |
| 2010/0134055 A1* | 6/2010 | Leong | H02P 6/182 318/400.14 |
| 2011/0031919 A1* | 2/2011 | Green | H02P 21/06 318/432 |
| 2011/0260669 A1* | 10/2011 | Nakahata | H02P 7/29 318/503 |
| 2012/0326643 A1* | 12/2012 | Brannen | H02P 6/18 318/400.11 |
| 2013/0221880 A1 | 8/2013 | Sekihara | |
| 2014/0062365 A1* | 3/2014 | Reynolds | H02P 6/153 318/400.35 |
| 2014/0340008 A1* | 11/2014 | Reynolds | H02P 1/52 318/400.11 |
| 2015/0180378 A1* | 6/2015 | Ogawa | H02P 6/182 318/376 |

FOREIGN PATENT DOCUMENTS

| | | |
|---|---|---|
| JP | 4662729 B2 | 3/2011 |
| JP | 2012-105406 A | 5/2012 |
| JP | 2012-222950 A | 11/2012 |
| JP | 2013-31273 A | 2/2013 |
| JP | 2013-81320 A | 5/2013 |
| JP | 2013-183478 A | 9/2013 |

OTHER PUBLICATIONS

Application Note LV8804FV from ON Semiconductor, Bi-CMOS LSI PC and Server Fan Motor Driver Application Note, pp. 1-29, Dec. 2013, Semiconductor Components Industries, LLC, http://onsemi.com.

Datasheet No. BD63241FV from ROHM Semiconductor, DC Brushless Motor Drivers Three Phase 1 Hall Full-Sine Fan Motor Driver, pp. 1-15, 2013, TSZ22111-14-001, www.rohm.com.

Datasheet LV11961HA from ON Semiconductor, Bi-CMOS LSI for Brushless Motor Drive Sine Wave PWM Drive, Pre driver IC, pp. 1-14, Oct. 2014, Rev. 1, Publication Order No. LA11961HA/D, Semiconductor Components Industries, LLC, http://onsemi.com.

Datasheet LV8139JA from ON Semiconductor, Bi-CMOS LSI Single-phase Fan Motor Driver, pp. 1-18, May 2013, Ordering No. ENA2154, Semiconductor Components Industries, LLC, http://onsemi.com.

* cited by examiner

MOTOR CONTROL CIRCUIT AND METHOD

BACKGROUND

The present invention relates, in general, to motors and, more particularly, to three phase motors.

Multi-phase motors are used in a variety of applications including disc drives, digital video disc players, scanners, printers, plotters, actuators used in automotive and aviation industries, etc. Generally, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. The motors are driven by motor drive circuits.

Motor drive circuits are designed to meet desired motor performance parameters which may include noise level specifications, start-up specifications, maximum rotational speed specifications, etc. Noise specifications may be set to provide continuity of current flow during motor startup, or during motor rotation, or during motor stoppage. Start-up or motive power specifications may be set so that the motor reliably starts. Rotational speed specifications may be set to ensure there is sufficient torque drive to cover a large number of different motors. For example, the desired rotational speed of a server is higher than that of a personal computer. It is commonly believed that three-phase motors are better at achieving the desired specifications compared to single phase motors; however, three-phase motors cost more than single phase motors. In addition, three-phase motors provide current having sinusoidal characteristics from motor start-up to motor stoppage or cessation and they allow accurate determination of motor position and rotation speed. Three-phase motors typically include three Hall sensors, which is one of the reasons these motors are more expensive to manufacture. A Hall sensor may be referred to as a Hall element. U.S. Pat. No. 6,359,406 issued to Hsien-Lin Chiu et al. on Mar. 19, 2002, discloses three-phase motors and in particular discloses a three-phase motor having two Hall sensors or two Hall elements. A drawback with this technology is that it uses special bias circuitry that complicates its design and increases costs. A technique to lower the cost of three-phase motors is to manufacture the motor drive circuitry as a sensorless motor drive circuit, i.e., a motor without sensors. U.S. Pat. No. 6,570,351 issued to Shinichi Miyazaki et al. on May 27, 2003, discloses a three-phase motor without sensors. A drawback with sensor-less motor drive configurations is that they may fail to start if the inductive voltage of the coil is small. Another drawback is that stopping procedures for the motor typically include rapidly shutting off the output pulse width modulation signal which creates large fluctuations in coil current and can generate a revving sound from the motor. This noise is particularly noticeable during low speed rotation.

Accordingly, it would be advantageous to have a multi-phase motor drive circuit and a method for driving the motor configured to reduce noise during a stopping procedure. It is desirable for the multi-phase drive circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
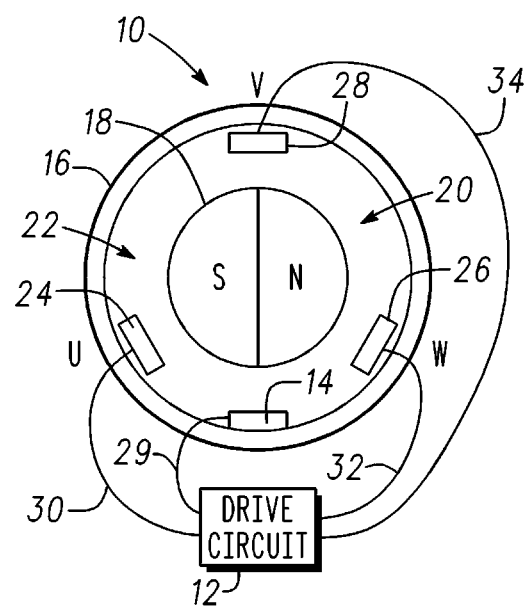
FIG. 1 is a diagrammatic representation of a motor that is driven by a drive circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

The present description includes, among other features, a motor drive circuit and a method for driving a motor that includes a stopping circuit configured to decrease a duty of a drive signal to a predetermined level such as, for example, 0%, while maintaining rotor rotation when arriving at the predetermined duty level. The stopping circuit enters a short brake state in which the rotor slowly stops. Then the stopping circuit places the drive transistors in a high impedance state.

In accordance with an embodiment, a method for stopping a motor includes providing a pulse width modulation signal having a duty at a first level then decreasing the duty of the pulse width modulation signal from the first level to a predetermined level. A braking state is entered in response to the duty of the pulse width modulation signal achieving the predetermined level.

In accordance with an aspect, a stopping motor determines if the motor has stopped after entering the braking state.

In accordance with another aspect, the predetermined level ranges from about 10% to about 0%.

In accordance with another aspect, decreasing the duty of the pulse width modulation signal comprises determining an amount to decrease the duty of the pulse width modulation signal and adjusting the duty of the pulse width modulation signal using the amount to decrease the duty of the pulse width modulation signal.

In accordance with another aspect, decreasing the duty of the pulse width modulation signal further includes comparing the duty with the predetermined level and in response to the duty being greater than the predetermined level continuing to decrease the duty.

In accordance with another aspect, a stopping circuit generates a signal in response to an output signal of a Hall sensor, determines a period of the signal generated in response to the output signal of the Hall sensor, and enters a high impedance state in response to the period of the signal generated in response to the output signal of the Hall sensor being greater than a predetermined value.

In accordance with another aspect, the method for stopping the motor applies to a fan motor.

In accordance with another aspect, the drive transistors enter into a high impedance state in response to the motor being stopped.

In accordance with another embodiment, a method for stopping a motor comprises providing a motor having a rotor, a stator, and a plurality of coils and coupling a sensing device and a drive circuit to the motor. A duty of a drive signal that drives the motor is provided wherein the duty is at a first level. Alternatively, the duty of the drive signal may be determined. The duty of the drive signal is reduced from the first level in response to a pulse width modulation (PWM) OFF signal indicating that an input PWM signal is off. The motor enters a braking state in response to the duty of the drive signal achieving a predetermined level.

In accordance with an aspect, reducing the duty of the drive signal includes linearly reducing the duty of the drive signal.

In accordance with another aspect, first, second, and third pairs of transistors are provided wherein the first pair of transistors comprises a first transistor coupled to a second transistor; the second pair of transistors comprises a third transistor coupled to a fourth transistor; and the third pair of transistors comprises a fifth transistor coupled to a sixth transistor. In addition, entering the high impedance state includes turning off a plurality of transistors; and entering the braking state includes turning off one transistor of the first pair of transistors, one transistor of the second pair of transistors, and one transistor of the third pair of transistors.

In accordance with another aspect, the high impedance state is entered in response to the motor being stopped.

In accordance with another aspect, entering the high impedance state includes turning off the transistors of the first, second, and third pairs of transistors that are on.

In accordance with another embodiment, the stopping circuit, comprises a detection circuit connected to a subtraction amount determination circuit. A subtraction circuit is connected to the subtraction amount determination circuit and a duty determination circuit is connected to the subtraction circuit. A state controller has an input connected to an output of the duty determination circuit and another input connected to a counter.

FIG. 1 is a diagrammatic representation of a three-phase motor 10 that is driven by a drive circuit 12 in response to one or more signals from a Hall sensor 14 in accordance with an embodiment of the present invention. By way of example, motor 10 may be a fan motor. It should be understood that motor 10 is not limited to being a fan motor. Drive circuit 12 may be referred to as a driver and Hall sensor 14 may be referred to as a Hall element. Three-phase motor 10 includes a stator 16 and a rotor 18 having a portion 20 magnetized with a first pole and a portion 22 magnetized with a second pole. By way of example, portion 20 is a north pole and portion 22 is a south pole. A U-phase winding 24 is coupled to or mounted on a portion of stator 16, a W-phase winding 26 is coupled to or mounted on another portion of stator 16, and a V-phase winding 28 is coupled to or mounted on yet another portion of stator 16. Drive circuit 12 is coupled to Hall sensor 14 via an electrical interconnect 29, to U-phase winding 24 via an electrical interconnect 30, to W-phase winding 26 via an electrical interconnect 32, and to V-phase winding 28 through an electrical interconnect 32. Electrical interconnects 30, 32, and 34 may be wires, electrically conductive traces, or the like.

Figure 2:
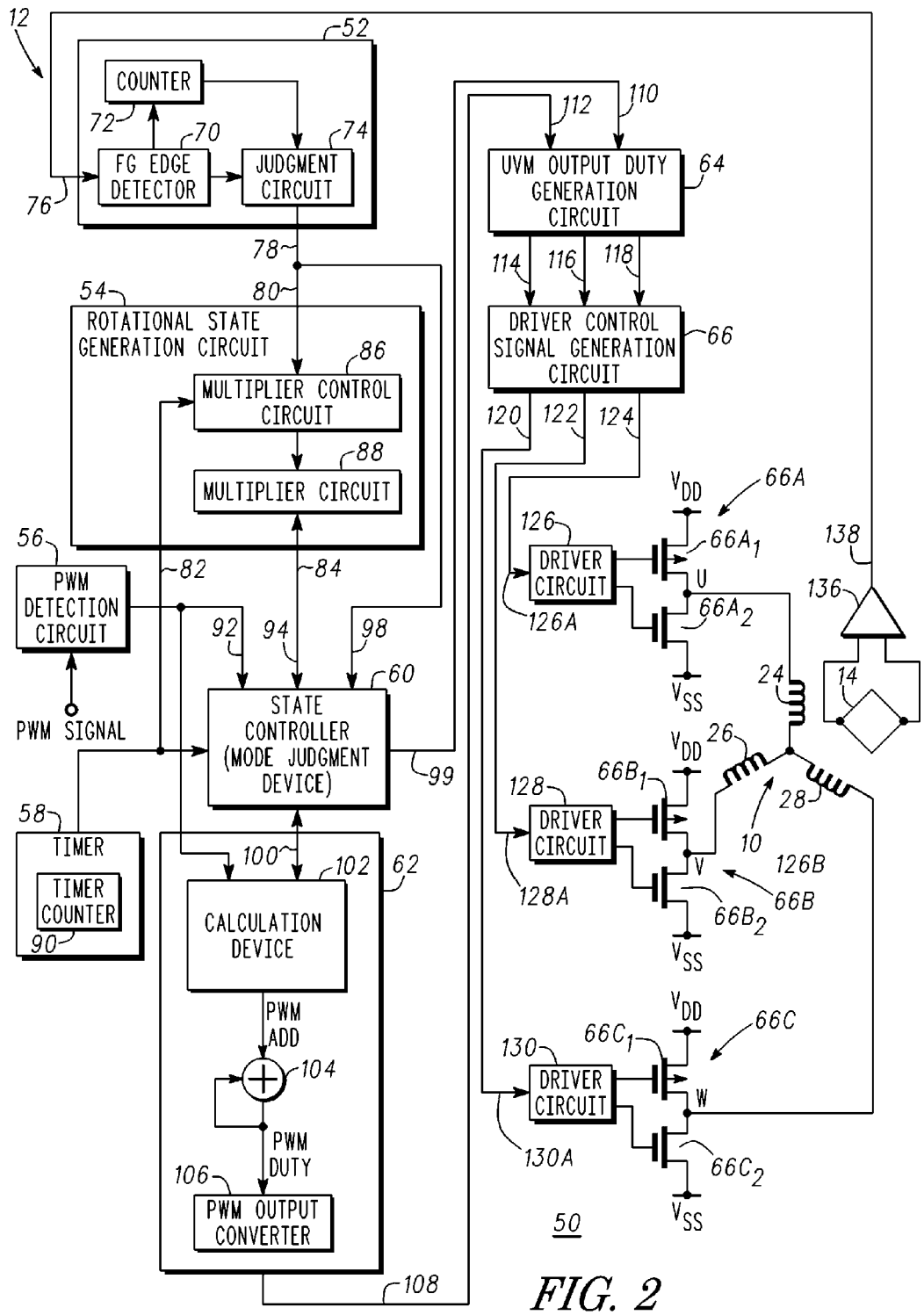
FIG. 2 is a block diagram further illustrating the drive circuit of FIG. 1.

FIG. 2 is a block diagram 50 further illustrating drive circuit 12. It should be noted that block diagram 50 includes diagrammatic representations of drive circuit 12, three-phase motor 10, and Hall sensor 14. Drive circuit 12 includes an FG signal masking circuit 52, a rotational state generation circuit 54, a pulse width modulation ("PWM") detection circuit 56, a timer 58, a status controller 60, a duty control controller 62, an output duty generation circuit 64, a drive control signal generation circuit 66, and an output drive stage 68. More particularly, FG signal masking circuit 52 may be comprised of an FG signal edge detector 70, a counter 72, and an FG signal judgment circuit 74. FG signal edge detector 70 has an input that serves as an input 76 of drive circuit 12, an output connected to an input of counter 72 and an output connected to an input of FG signal judgment circuit 74. An output 78 of FG signal judgment circuit 74 serves as an output of FG signal masking circuit 52. FG signal masking circuit 52 may be referred to as a chattering mitigation circuit or a chattering mitigation feature.

Rotational state generation circuit 54 has inputs 80 and 82, an input/output 84, and may be referred to as an FG generation circuit. Output 78 of FG signal masking circuit 52 is connected to input 80 of FG generation circuit 54. Input/output 84 may be referred to as an input/output node, an I/O node, an input/output terminal, an I/O terminal, or the like. Rotational state generation circuit 54 may be comprised of a control circuit 86 coupled to a multiplier circuit 88. It should be noted that input 80 and input 84 are connected to multiplier control circuit 86 and input/output 84 is connected to multiplier circuit 88. PWM detection circuit 56 has an output connected to an input of state controller 60 and to an input of duty control controller 62 and is configured to determine the speed of rotor 18. It should be noted that if the duty range is small the speed of the rotor is smaller than if the duty range is large. Timer 58 has an output connected to input 82 of rotational state generation circuit 54 and to an input 92 of state controller 60 and may include a timer counter 90. In addition, state controller 60 has an input/output 94 connected to an input/output 84 of rotational state generation circuit 54, an input 98 connected to output 78 of FG signal masking circuit 52, and an input/output 96 connected to an input/output 100 of duty control controller 62. By way of example, duty control controller 62 is comprised of a calculation device 102 configured to determine an amount of change to the duty cycle, a summer 104, and a PWM converter 106. Calculation device 102 has an input that serves as input/output 100 and an output connected to an input of summer 104. In addition, summer 104 has an output that is connected to an input of PWM output converter 106 and to another input of summer 104. An output 108 of PWM output converter 106 serves as an output of duty control controller 62. State controller 60 is configured for determining the status or condition of the FG signal and the PWM signal and duty control controller 62 is configured to control an output sine wave, which helps to make the motor quieter.

Output duty generation circuit 64 has an input 110 connected to an output 99 of output of state controller 60, an input 112 connected to output 108 of output duty generation circuit 62, and a plurality of outputs 114, 116, and 118 connected to corresponding inputs of drive control signal generation circuit 66, which signal generation circuit 66 has a plurality of outputs 120, 122, and 124 connected to corresponding inputs of output drive stage 68. In accordance with an embodiment, drive stage 68 includes driver devices 126, 128, and 130 having inputs that serve as inputs 126A, 128A, and 130A of output drive stage 68, a pair 66A of transistors having a terminal connected to U-phase winding 24, a pair 66B of transistors having a terminal connected to W-phase winding 26, and a pair 66C of transistors having a terminal connected to V-phase winding 28. Pair of transistors 66A is comprised of transistors $66A_1$ and $66A_2$, wherein each transistor has a control electrode, and a pair of current carrying electrodes. The control electrodes of transistors $66A_1$ and $66A_2$ are coupled for receiving control signals from driver device 126, one current carrying electrode of transistor $66A_1$ is coupled for receiving a source of potential $V_{DD}$ and the other current carrying electrode of transistor $66A_1$ is connected to a current carrying electrode of transistor $66A_2$. The other current carrying terminal of transistor $66A_2$ is coupled for receiving a source of potential $V_{SS}$ such as, for example, a ground potential. The commonly connected current carrying electrodes of transistors $66A_1$ and $66A_2$ are connected to U-phase winding 24.

Pair of transistors 66B is comprised of transistors $66B_1$ and $66B_2$, wherein each transistor has a control electrode, and a pair of current carrying electrodes. The control electrodes of transistors $66B_1$ and $66B_2$ are coupled for receiving control signals from driver device 128, one current carrying electrode of transistor $66B_1$ is coupled for receiving a source of potential $V_{DD}$ and the other current carrying electrode of transistor $66B_1$ is connected to a current carrying electrode of transistor $66B_2$. The other current carrying terminal of transistor $66B_2$ is coupled for receiving a source of operating potential $V_{SS}$ such as, for example, a ground potential. The commonly connected current carrying electrodes of transistors $66B_1$ and $66B_2$ are connected to U-phase winding 26.

Pair of transistors 66C is comprised of transistors $66C_1$ and $66C_2$, wherein each transistor has a control electrode, and a pair of current carrying electrodes. The control electrodes of transistors $66C_1$ and $66C_2$ are coupled for receiving control signals from driver device 130, one current carrying electrode of transistor $66C_1$ is coupled for receiving a source of potential $V_{DD}$ and the other current carrying electrode of transistor $66C_1$ is connected to a current carrying electrode of transistor $66C_2$. The other current carrying terminal of transistor $66C_2$ is coupled for receiving a source of operating potential $V_{SS}$ such as, for example, a ground potential. The commonly connected current carrying electrodes of transistors $66C_1$ and $66C_2$ are connected to U-phase winding 28.

A comparator 136 has inputs connected to corresponding inputs of a Hall sensor 14 and an output 138 connected to input 76 of rotational state generation circuit 54.

It should be noted that in accordance with an alternative embodiment, FG signal masking circuit 52 is absent from drive circuit 12 and that output 138 of comparator 136 is commonly connected to input 76 of rotational state generation circuit 54 and to input 98 of state controller 60.

In accordance with an embodiment, an output duty gradually decreases for a specific period of time and the motor shuts off in response to passage of a predetermined period of time after a rotation signal is no longer detected.

In accordance with an embodiment, a control circuit controls a motor which has a rotor with a magnetic pole, a three-phase stator with an exciting coil and a single Hall element used for detecting position of the rotor.

In accordance with another embodiment, the output pulse width modulation (PWM) signal ceases gradually upon termination of an input PWM, where the output PWM signal gradually decreases with a change ratio in a sine wave-like fashion over a predetermined period of time. Thus, the output PWM gradually stops or has a ceased status.

Figure 3:
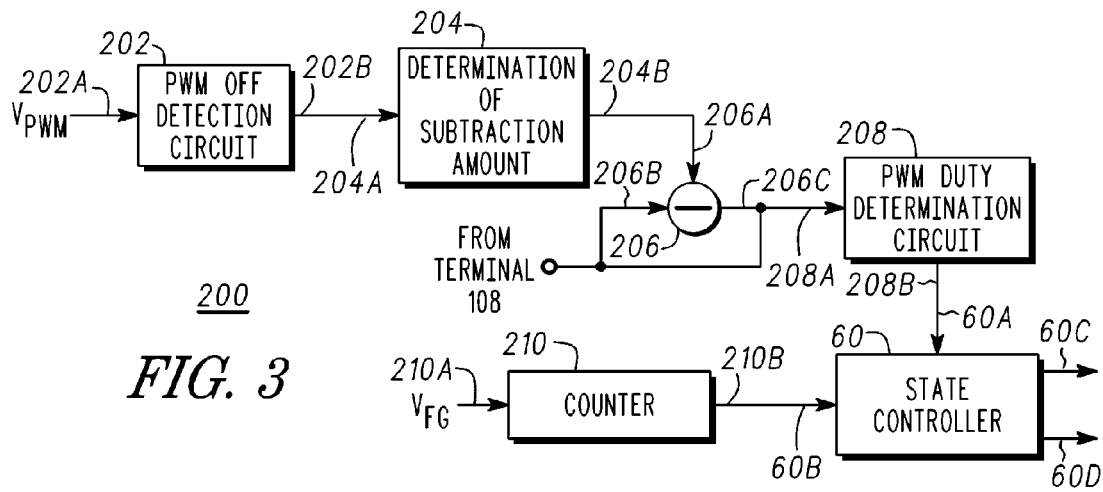
FIG. 3 is a circuit diagram of a stopping circuit in accordance with an embodiment of the present invention.

FIG. 3 is a circuit diagram of a stopping circuit 200 in accordance with an embodiment of the present invention. Stopping circuit 200 may be referred to as a braking circuit. Stopping circuit 200 includes a PWM OFF detection circuit 202, a circuit 204 configured for determining an amount of subtraction, a subtractor circuit 206, a PWM duty determination circuit 208, a counter 210, and state controller 60. More particularly, PWM OFF detection circuit 202 has an input 202A coupled for receiving a PWM input signal $V_{PWM}$ and an output connected to an input 204A of circuit 204. Subtractor circuit 206 has an input 206A connected to an output 204B of circuit 204 and an output 206C connected to its input 206B and to an input 208A of PWM duty determination circuit 208. Output 108 of duty control controller 62 is connected to output 206C of subtractor 206 and to input 208A of PWM duty determination circuit 208. PWM duty determination circuit 208 has an output 208B connected to an input 60A of state controller 60 and determines whether the duty of the output signal at output 108 of duty control controller 62 is greater than a predetermined duty level or less than or equal to the predetermined duty level. In accordance with an embodiment, the predetermined duty level is 0 percent (%). However, the predetermined duty level is not limited to 0%, but can be another value such as, for example, 1%, 2%, 3%, or a value between 3% and 20%, etc.

Counter 210 has an input coupled for receiving a rotation indicator signal $V_{FG}$ and an output 210B connected to an input 60B of state controller 60. State controller 60 has an output 60C through which a PWM OFF order signal is transmitted indicating the order in which the drive transistor pairs are turned off and an output 60D through which a braking order is indicated.

Figure 4:
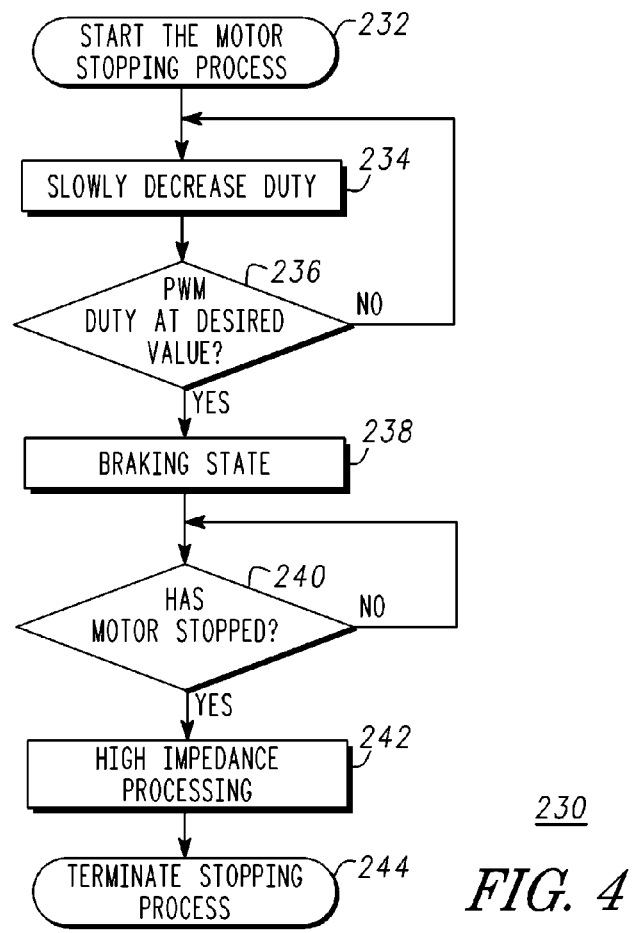
FIG. 4 is a flow diagram for gradually stopping a motor in accordance with an embodiment of the present invention.

FIG. 4 is a flow diagram 230 illustrating a stopping process in accordance with an embodiment of the present invention. The stopping process begins (indicated by box 232) and at a beginning step PWM signal detection circuit 202 detects whether a PWM input signal is present. In response to a PWM off signal that indicates that the input PWM signal is off, stopping circuit 200 reduces the duty of the drive signal that appears at output 108 of duty control controller 62. Stopping circuit 200 calculates an amount to lower or decrease the duty of the drive signal at terminal 108 and subtracts this amount from the drive signal, thereby decreasing the duty of the drive signal (indicated by box 234), i.e., adjusting the duty of the pulse width modulation signal using the amount to decrease the duty of the pulse width modulation signal. Stopping circuit 200 compares the duty of the drive signal at terminal 108 with a predetermined level and if the duty is greater than the predetermined duty level, continues decreasing the duty as indicated by the NO branch of decision diamond 236. Thus, the duty of the drive signal is decreased to the predetermined duty level. In accordance with an embodiment, the predetermined duty level is 0 percent (%). The duty may be gradually decreased or reduced at a constant rate to a value between, for example, 10% and 0%.

If the duty of the drive signal is less than or equal to the predetermined duty, i.e., the duty of the drive signal has achieved a predetermined level, stopping circuit 200 enters a short braking state (indicated by box 238). In accordance with an embodiment, during the short braking state stopping circuit 200 turns off p-channel transistors $66A_1$, $66B_1$, and $66C_1$ (shown in FIG. 2). It should be noted that n-channel transistors $66A_2$, $66B_2$, and $66C_2$ (shown in FIG. 2) are still conducting current.

Counter 210 counts the oscillations of the output signal generated in response to the output signal from Hall sensor 14 to determine the period of the Hall sensor output signal. It should be noted that the output signal of comparator 136 that is generated in response to the output signal from Hall Sensor 14 may be referred to as an FG signal $V_{FG}$. Stopping circuit 200 determines whether motor 10 has stopped as indicated by decision diamond 240. By way of example, motor stoppage may be indicated by the period of the FG signal $V_{FG}$ exceeding a pre-set period or a predetermined period. If the period of FG signal $V_{FG}$ is less than the predetermined period, then stopping circuit 200 remains in the braking state (indicated by the NO branch of decision diamond 240). If the period of signal $V_{FG}$ is greater than the predetermined period then counter 210 sends a stop detection signal to state controller 60 and stopping circuit 200 performs high impedance processing (indicated by the YES branch of decision diamond 240 and box 242). In response to performing high impedance processing, stopping circuit 200 turns off n-channel transistors $66A_2$, $66B_2$, and $66C_2$, thereby placing transistors $66A_1$, $66B_1$, $66C_1$, $66A_2$, $66B_2$, and $66C_2$ in a high impedance state. Stopping circuit 200 terminates the stopping process (indicated by box 244).

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for stopping a motor, comprising:
   in response to an input pulse width modulation signal being off, generating a pulse width modulation off signal;
   decreasing a duty of a drive signal to a driver circuit;
   in response to the pulse width modulation off signal;
   comparing the duty of the drive signal with a predetermined level;
   in response to the duty of the drive signal being greater than the predetermined level, continue decreasing the duty of the drive signal;
   in response to the duty of the drive signal being less than or equal to the predetermined level, entering a braking state which includes turning off a first transistor; and
   in response to the motor stopping, performing high impedance processing including turning off a second transistor.

2. The method of claim 1, further including determining if the motor has stopped after entering the braking state.

3. The method of claim 2, further including setting the predetermined level to a value ranging from 10% to 0%.

4. The method of claim 3, wherein setting the predetermined level to a value ranging from 10% to 0% includes setting the predetermined level to a value of 0%.

5. The method of claim 1, wherein decreasing the duty of the drive signal comprises:
   determining an amount to decrease the duty of the drive signal; and
   adjusting the duty of drive signal using the amount to decrease the duty of the drive signal.

6. The method of claim 5, wherein decreasing the duty of the drive signal further includes comparing the duty with the predetermined level and in response to the duty being greater than the predetermined level continuing to decrease the duty.

7. The method of claim 1, further including:
   generating a signal in response to an output signal of a Hall sensor;
   determining a period of the signal generated in response to the output signal of the Hall sensor; and
   entering a high impedance state in response to the period of the signal generated in response to the output signal of the Hall sensor being greater than a predetermined value.

8. The method of claim 1, further including a fan motor as the motor.

9. The method of claim 1, further including entering a high impedance state in response to the motor being stopped.

10. A method for stopping a motor, comprising:
    providing a drive circuit configured to drive the motor;
    providing a drive signal that has a duty at a first level, wherein the drive signal is configured to drive the motor;
    reducing the duty of the drive signal from the first level in response to a pulse width modulation (PWM) OFF signal that indicates that an input PWM signal is off; and
    entering a braking state in response to the duty of the drive signal achieving a predetermined level which includes turning off a first transistor;
    in response to the motor stopping, performing high impedance processing including turning off a second transistor.

11. The method of claim 10, wherein the motor is a fan motor.

12. The method of claim 10, wherein reducing the duty of the drive signal includes linearly reducing the duty of the drive signal.

13. The method of claim 12, wherein the desired value of the duty ranges from about 10% to about 1%.

14. The method of claim 12, wherein the desired value of the duty is 0%.

15. The method of claim 10, further including entering a high impedance state in response to the motor being stopped.

16. The method of claim 10, further including:
providing a first pair of transistors comprising a first transistor coupled to a second transistor;
providing a second pair of transistors comprising a third transistor coupled to a fourth transistor;
providing a third pair of transistors comprising a fifth transistor coupled to a sixth transistor; and wherein
entering the high impedance state includes turning off a plurality of transistors; and wherein
entering the braking state includes turning off one transistor of the first pair of transistors, one transistor of the second pair of transistors, and one transistor of the third pair of transistors.

17. The method of claim 16, further including entering a high impedance state in response to the motor being stopped.

18. The method of claim 17, wherein entering the high impedance state includes turning off another transistor of the first pair of transistors, another transistor of the second pair of transistors, and another transistor of the third pair of transistors.

19. The method of claim 10, further including:
generating a sensing signal in response to a signal from the sensing device, the sensing signal having a period;
determining that the motor is stopped in response to the period of the sensing signal being greater than a predetermined period.

* * * * *